April 11, 1961    R. H. WITT    2,979,173
CHOPPER ROTOR MOUNTING AND DRIVE THEREFOR
Filed Sept. 30, 1959
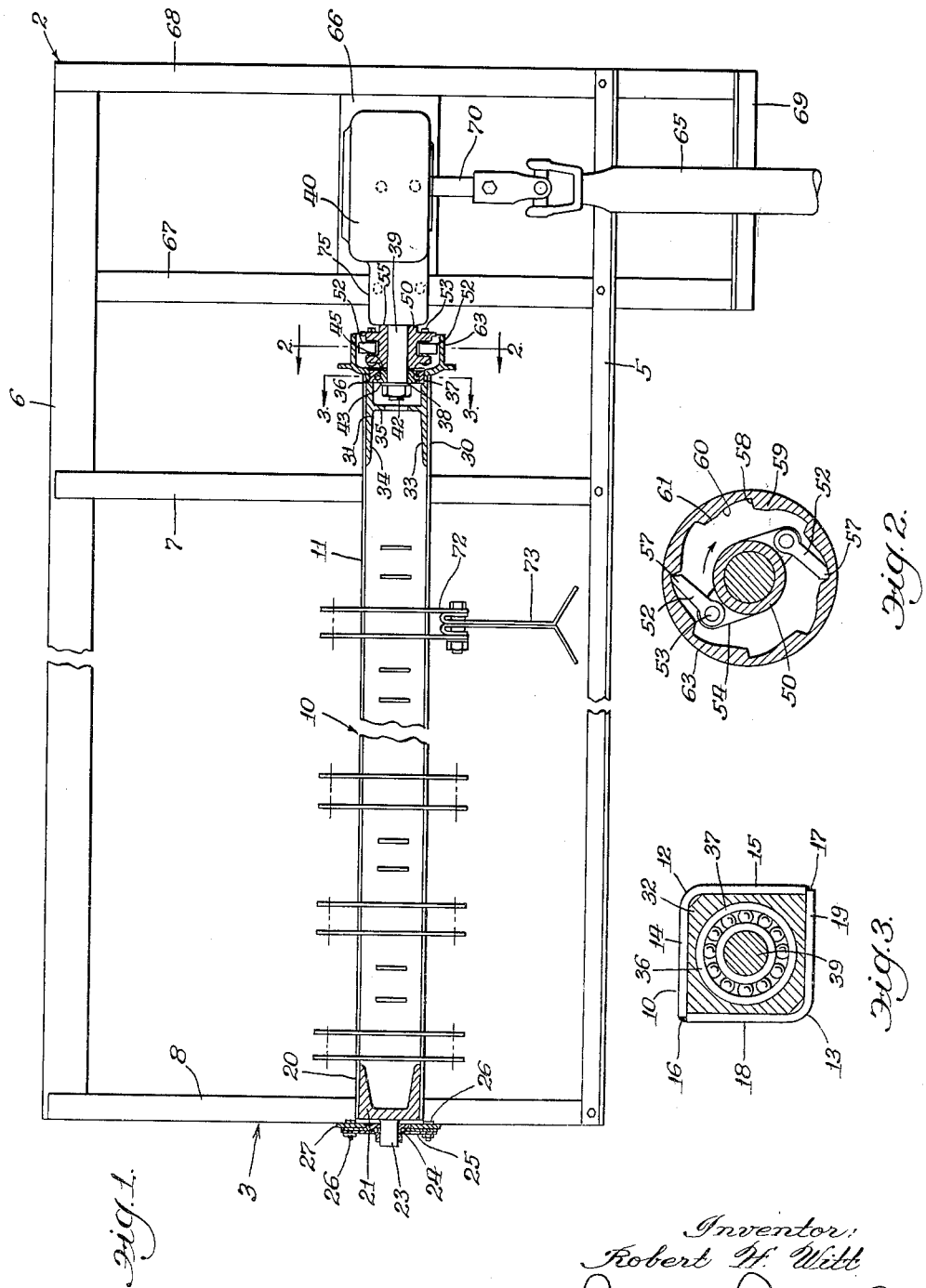
Inventor:
Robert H. Witt
Atty.

United States Patent Office 2,979,173
Patented Apr. 11, 1961

2,979,173

CHOPPER ROTOR MOUNTING AND DRIVE THEREFOR

Robert H. Witt, Hinsdale, Ill., assignor to International Harvester Company, Chicago, Ill., a corporation of New Jersey Filed Sept. 30, 1959, Ser. No. 843,435

5 Claims. (Cl. 192—3.5)

This invention relates to forage choppers and more specifically for a mounting and drive for the rotor.

A general object of the invention is to provide a novel and simple and efficient mounting for the rotor shaft of the chopper.

A further object of the invention is to provide a novel mounting for the rotor shaft which includes an over-running clutch and bearing mounting for the rotor shaft and in which the output shaft of the gear box which transmits power from the power take-off shaft of the tractor, serves as a support for the proximate end of the rotor shaft.

A still further object of the invention is to provide a novel, simple and efficient mounting for a rotor shaft wherein the mounting permits ready assembly and disassembly and facilitates manufacturing practices.

A further object of the invention is to provide a combination over-running clutch and self aligned coupling.

These and other objects of the invention will become more apparent from the specification and the drawings wherein:

Figure 1 is a broken apart plan view partially in section of the rotor and mounting therefor and the drive thereto;

Figure 2 is an enlarged sectional view taken substantially on the line 2—2 of Figure 1; and Figure 3 is a further enlarged sectional view taken substantially on the line 3—3 of Figure 1.

Describing the invention in detail and having particular reference to the drawings, there is shown a support frame generally designated 2 for the chopper 3 which is of the type shown in U.S. Patent 2,758,435. The framework 2 includes a pair of front and rear beam members 5 and 6 and interconnecting fore and aft extending inboard and outboard members 7 and 8 which define the confines or the transverse width of the rotor housing (not shown) which encloses the rotor generally designated 10.

The rotor 10 comprises a center shaft 11 which is a box member comprising a pair of opposed angle beams 12 and 13. The webs 14, 15 of beam 12 are connected as at 16 and 17 to the abutting webs 18 and 19 of the member 13 to form the box section.

The outboard end 20 of the beam member 10 receives a complementary pillar or block 21 to which the members 12 and 13 are suitably connected preferably as by welding.

The block 21 is formed integral with a stub shaft 23 which mounts in a bearing 24 carried by a mounting flange 25 suitably secured as by bolt and nut assemblies 26 to a mounting plate 27 which is suitably secured to the beam member 8.

The grass-ward or inboard end 30 of the beam member 10 is secured to a skeletal insert 31 to which the beam members 12 and 13 are suitably secured as by welding, said member 31 in addition to having the transversely spaced walls 33 and 34 have an intervening rigidifying wall 35. The member 31 has a generally square portion 32 provided with an outwardly facing bore 36 which receives a bearing 37 mounted on the free end 38 of the output shaft 39 projecting from the gear box 40. The free end 38 of the shaft 39 is provided with a threaded portion on which is secured a nut 42 which abuts against the outer side 43 of the bearing structure 37, the bearing structure 37 abutting on its innerside 45 against the adjacent end of a dog carrier 50 which is keyed to the shaft 39, the dog carrier 50 pivotally mounting at diametrically opposite sides the inner ends of a pair of dogs 52 by pins 53 which extend through companion ears 54 formed integral with the hub portion 55 of the carrier 50. The dogs 52 have their distal ends 57 erected against the opposing surfaces 58 of teeth 59 which provide sloping ramps 60 on their back sides leading to a crest 61 which merges into the tooth face 58. The teeth 59 are formed within the bell housing 63 and project inwardly therefrom, the housing 63 being an integral part of the member 30 and an extension of portion 32.

In operation the power take-off shaft 65 drives the usual bevel gearing (not shown) within the housing or gear case 40 which is mounted upon the cross member 66 in the main frame structure between the fore and aft extending hitch beams 67 and 68 which are joined at their forward ends by cross member 69. The drive is received through the gear box into the input shaft 70 and is delivered to the output shaft 39 which rotates the dog assembly 50 in the direction of the arrow shown in Figure 2 which through centrifugal action expands the dogs against the back sides of the teeth 59 engaging the ends of the dogs 57 with the tooth profile 58 thus driving the bell housing 63 being part of the member 30 drives the shaft 10 and with it rotating the knive assemblies 72, 73 in an orbital path in a manner similar to that pointed out and explained in the before mentioned U.S. patent.

It will be understood that the rotor assembly is mounted entirely separately from the housing of the chopper and that simply by loosening the appropriate bolts 26 and thus providing for removal of the rotor endwise the rotor 10 is withdrawn from the output shaft 39 simply by endwise movement removing the member 31, that is disassociating the bore 36 from the bearing 37 and withdrawing the housing 63 from the dog structure. The mounting of the rotor is just as simple and that is by merely re-entering the housing and the bore over the dog assembly and the bearing 36 and then merely applying the bearing structure 24, 25 and bolting by the bolts 26 the rotary is immediately assembled with the support.

It will be understood that in operation, when the drive is terminated from the shaft 65, the output shaft 39 ceases to rotate, the overrunning clutch arrangement permits the rotor to rotate on the bearings 36 and 24, but while the drive is being delivered the support is on the shaft 39 which is carried from the large bearing structure 75 which extends from the gear casing 40. Thus a novel arrangement is achieved wherein during normal operation adequate support is provided for the rotor from the gear case and after the drive is terminated the rotor may freely rotate about the secondary bearing which not being load carrying, as such, is of simple and inexpensive construction and also provides for angular misalignment when not rotating thus providing a flexible drive means.

What is claimed is:

1. In a forage chopper, the combination of a support frame including laterally spaced structures, a gear box mounted upon one of the structures and having an input shaft and an output shaft, a rotor having a center shaft, means rotatably mounting one end of the center shaft from the other of said structures, said center shaft having a telescoping relationship with said output shaft and rotatable thereon in overrunning relationship thereto, and overrunning one-way drive means operatively associated with said output and said center shafts.

2. In a forage chopper, the combination of a support frame including laterally spaced structure, a gear box mounted upon one of the structures and having a forwardly projecting input shaft and a laterally projecting output shaft, a rotor having a center shaft, means rotatably mounting one end of the center shaft from the other of said structures, said center shaft having a telescoping relationship with said output shaft and rotatable in overrunning relationship thereto, and one-way drive means operatively associated with said output and said center shafts, and said output shaft disposed within the center shaft and bearing means interposed between said output shaft and said center shaft and secured to said output shaft and pocketed within an open ended bore in the center shaft to accommodate removal of the center shaft from the output shaft by relative endwise movement therebetween.

3. In a forage chopper, the combination of a support frame, a gear box mounted thereon and having an output shaft, a rotor having a center shaft in axial alignment with said output shaft and having a socket at one end receiving the output shaft therein, means removably mounting said center shaft at its other end from the frame, bearing means interposed between said socket and said output shaft accommodating free rotation of said center shaft with respect to the output shaft, an overrunning clutch operative between said shafts and comprising a first and second portions connected respectively to the center shaft and said output shaft and separable by endwise movement of the rotor disengaging the center shaft socket portion from the output shaft.

4. The invention according to claim 3 and said overrunning clutch comprising a bell housing connected to said one end of the center shaft and having internal inwardly directed clutch teeth ad a hub mounted upon the output shaft and in assembled position of the rotor and output shaft extending within said housing, and at least two diametrically opposed dogs pivoted to the hub and swingable outwardly pursuant to rotation of said output shaft into engaging relation to said teeth.

5. A quick mounting and demounting support for a rotor having a center shaft comprising a bearing structure mounting one end of the shaft and having means for removable connection to an associated support and removable from the shaft by endwise displacement with respect to the shaft, a socket member on the other end of the shaft having an axial bore open at one end, a supporting power input shaft having a bearing thereon fitting within said bore, said shafts having axially separable and assemblable overrunning clutch elements for transmitting power from the output to the center shaft, and said center shaft rotatable on said bearing means at said one end and on said ouput shaft in overrunning said output shaft.

References Cited in the file of this patent
UNITED STATES PATENTS
1,168,435   Stant _____ Jan. 18, 1916